United States Patent [19]

Fabbi

[11] Patent Number: 4,974,966
[45] Date of Patent: Dec. 4, 1990

[54] CARRIER BAG OF BIODEGRADABLE FOLDABLE MATERIAL

[76] Inventor: Giorgio Fabbi, 15 Largo Olgiata, is. 36A/1, I-00123 Roma RM, Italy

[21] Appl. No.: 411,272

[22] Filed: Sep. 22, 1989

[30] Foreign Application Priority Data

Oct. 4, 1988 [IT] Italy ................................ 48413 A/88

[51] Int. Cl.⁵ ............................................. B65D 30/20
[52] U.S. Cl. .......................................... 383/1; 383/10; 383/120; 383/122
[58] Field of Search ........................ 383/1, 4, 120, 122, 383/69, 10, 12; 229/1.5 B, DIG. 4

[56] References Cited

U.S. PATENT DOCUMENTS

| | | | |
|---|---|---|---|
| 685,789 | 11/1901 | McKendrick | 383/10 |
| 1,101,430 | 6/1914 | Glidden et al. | 383/63 X |
| 1,310,288 | 7/1919 | Nico | 383/122 X |
| 1,334,066 | 3/1920 | Anderson | 383/122 X |
| 1,359,856 | 11/1920 | Anderson | 383/122 X |
| 1,909,127 | 5/1933 | Satterthwaite | 383/69 |
| 1,957,402 | 5/1934 | Abramson | 383/122 X |
| 2,147,117 | 2/1939 | Bensel | 383/69 X |
| 2,457,422 | 12/1948 | Warner | 383/120 X |

FOREIGN PATENT DOCUMENTS

427295 7/1911 France ................... 383/122

Primary Examiner—Stephen Marcus
Assistant Examiner—Jes F. Pascua
Attorney, Agent, or Firm—Browdy and Neimark

[57] ABSTRACT

A carrier bag is described, particularly of biodegradable material, obtained by means of successive folding operations of an integral flat blank on which a series of folding lines has been provided (FIG. 9).

5 Claims, 7 Drawing Sheets

CARRIER BAG OF BIODEGRADABLE FOLDABLE MATERIAL

BACKGROUND OF THE INVENTION

1. Field of the Invention

The present invention relates to a carrier bag obtained from a foldable sheet material preferably of biodegradable type.

2. Description of the Prior Art

In particular in the ecology field the serious problem is generally known of the difficult disposal of plastic products due to their deficiency in biodegradability. Of the above mentioned products the most widely used in the world are plastic bags which are employed for the most varied uses and are continuously disposed in an incredibly great number, thus producing serious, and even unsolvable, problems for their elimination.

SUMMARY OF THE INVENTION

Object of the present invention is to provide a carrier bag having a surprising functionality, which can be constructed in an extremely simple way from a flat blank obtained from a single sheet without using any glue. Preferably the sheet is of a biodegradable foldable material which can be easily destroyed after its use, which is able to be employed in lieu of similar bags of plastic material in order to overcome the above mentioned disadvantages.

A further object of the present invention is to provide a carrier bag of the above mentioned type having moreover an aesthetic aspect of considerable value.

The carrier bag of the present invention is obtained without using glue from an integral flat blank of rectangular shape with longitudinal and transversal sides of a foldable sheet material, on which a set of folding lines is provided, comprising: a longitudinal middle folding line parallel to the longitudinal sides of the blank; two longitudinal inner folding lines parallel and symmetrical to the middle folding line; two longitudinal peripheral folding lines parallel and symmetrical to the middle folding line, the distance of the peripheral folding lines from the middle line being at least twice the distance of the inner folding lines from the same middle line; two pairs of transversal folding lines parallel to the transversal sides of the blank, each pair being symmetrical to the other pair with respect to the middle line and each of the transversal folding lines extending from one of the longitudinal sides to meet the nearest inner folding line; two pairs of diagonal folding lines, each line of the pair extending from a common point on the middle line to a point on the transversal side closer to the common point, and bisecting the right-angle formed by the inner folding lines and the transversal folding lines, the arrangement of the above mentioned folding lines being such that by means of successive operations of folding the sheet along the folding lines, a carrier bag is obtained which in a flat condition has a substantially trapezoidal poligonal profile and in a formed condition has a substantially parallelepipedic shape with two substantially triangular side folds turned over the front and back faces of the bag and partially overlaid one on the other and with an upper flap turned over and fixed to each of the faces.

BRIEF DESCRIPTION OF THE DRAWINGS

The present invention will be further illustrated in the following description of embodiments thereof, with reference to the accompanying drawings, in which.

In the drawings, the edges of the blank are drawn with a solid line, whereas the folding lines are drawn with a broken line.

The crossing points of the lines are indicated with reference letters. Symmetrical points are indicated with the same letter and distinguished one from the other by an asterisk and no asterisk respectively, for the two symmetrical parts of the figures.

Consequently, in the following description the figures are illustrated rather in the conventional way as used for geometrical figures.

DETAILED DESCRIPTION OF THE PREFERRED EMBODIMENTS

Figure 1:
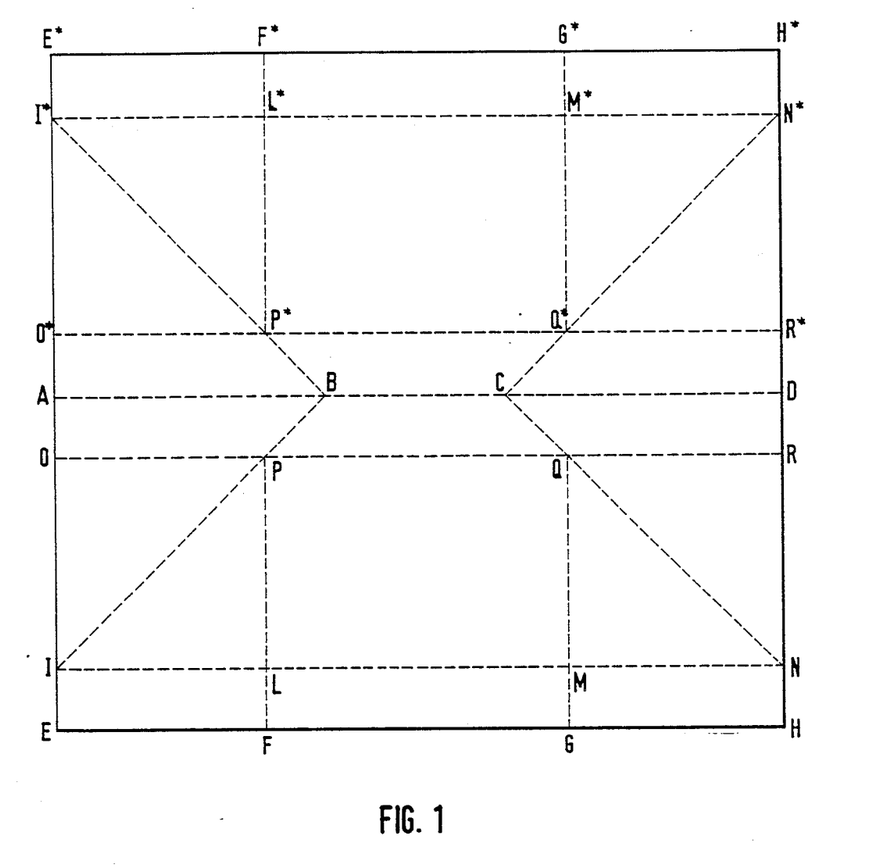
FIG. 1 is a plan view of the starting blank for obtaining the carrier bag of the invention.

Referring now to FIG. 1, there is shown a one-piece or integral flat blank for obtaining the carrier bag of the invention.

The blank is formed of a sheet E*H*HE of foldable preferably biodegradable material. Representatives of this material are paper, cardboard or cloth, eventually treated, or any other material of suitable strength In the present embodiment the blank, in the flat condition, has a substantially rectangular shape.

On this blank a set of distributed folding lines is provided, which comprise: a longitudinal middle folding line AD, parallel to the longitudinal sides E*H* and EH of the blank; two longitudinal inner folding lines O*R* and OR parallel to the middle folding line AD and symmetrical to this; two longitudinal peripheral folding lines I*N* and IN parallel and symmetrical to the middle folding line, the distance of the peripheral folding lines from the middle line being at least twice the distance of the inner folding lines from the same middle line; a first, second, third and fourth transversal folding line F*P*, G*Q*, FP and GQ perpendicular to the longitudinal folding lines and extending at the same distance from the respective transversal sides E*E and H*H of the blank. The first and the second transversal folding lines F*P* and G*Q* intersect the longitudinal peripheral folding line I*N* at points L* and M* respectively. The third and the fourth transversal folding lines FP and GQ intersect the longitudinal peripheral folding line IN at points L and M respectively. The folding line F*P* is aligned to the folding line FP, and the folding line G*Q* is aligned to the folding line GQ. The set of folding lines on the blank is completed by four folding lines at an angle with respect to the ones previously described, namely a first, second, third and fourth diagonal folding line I*B, N*C, IB and NC. The first diagonal folding line I*B bisects the right-angle between the folding line I*N* and the transversal side E*E of the blank to meet the middle folding line AD at an end point B, and it crosses the meeting point of the folding lines F*P* and O*R* at point P*. The second diagonal folding line N*C bisects the right angle between the folding line I*N* and the transversal side H*H of the blank, to meet the middle folding line AD at an end point C and it crosses the meeting point of the folding lines G*Q* and O*R* at point Q*. The third diagonal folding line IB bisects the right-angle between the folding line IN and the transversal side E*E of the blank to meet the middle folding line AD at the same end point B on the first diagonal folding line, and it crosses the meeting point of the folding lines FP and OR at point P. The fourth diagonal folding line NC bisects the right-angle between the folding line IN and the transversal side H*H of the blank, to meet the folding line AD at the same end point C on the second diagonal folding line N*C, and it crosses the meeting point of the folding lines GQ and OR at point Q.

Having described the blank on which the set of folding lines is provided, the operation will be illustrated hereinafter for forming the carrier bag of the invention in its three-dimensional shape.

Figure 2:
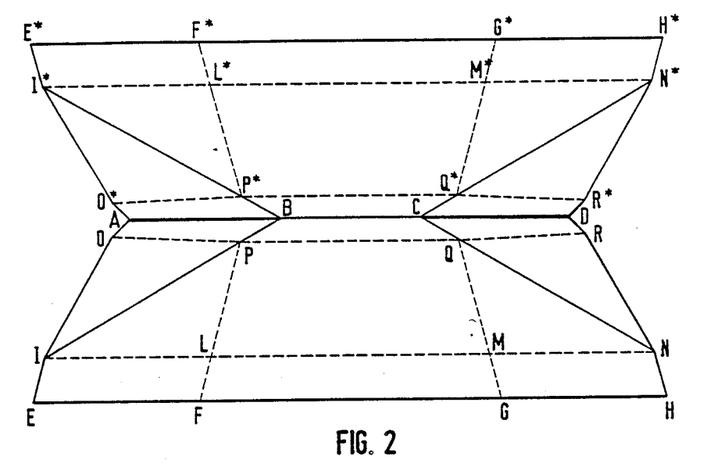
FIGS. 2 to 8 are illustrations explaining the various steps for forming the carrier bag of the invention, starting from the blank of FIG. 1.

Taking the points B and C as centers, the blank is folded along the diagonal folding lines I*P*B, N*Q*C, IPB, NQC. At the same time the blank folds inwards, i.e. behind the sheet, looking at the drawing, along the folding lines AB and CD. The rest rotates on the folding line BC in the direction above the sheet of the drawing, as shown in FIG. 2 in the course of the formation step. After folding as above, the blank E*H*HE on FIG. 3 is obtained in a flat condition, folded over itself along the line BC with the portions defined by I*AB and N*DC overlaid on the respective portions defined by IAB and NDC, in the form of a substantially trapezoidal geometric shape.

It will be further appreciated that the side I*O* of the triangle I*O*P* will be turned over, being brought into coincidence with the side I*L* of the triangle I*L*P*, symmetrical to the triangle I*O*P* with respect to the common side I*P*.

The same is true for the sides N*R*, IO and RN.

Figure 3:
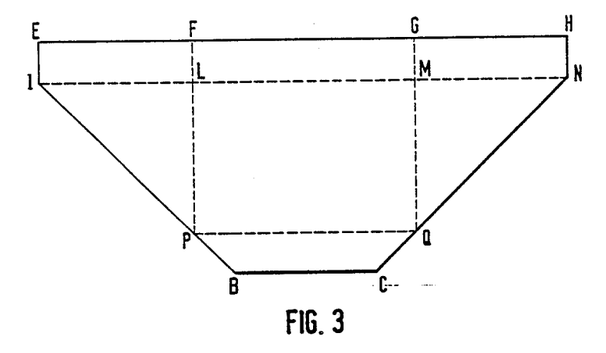

There is shown in FIG. 3 one of the two specularly symmetrical overlaid faces of the folded blank, namely the face defined by EHNCBI.

Hereinafter the successive steps will be described only with reference to the above mentioned face, the same steps being made for the opposite face.

Figure 4:
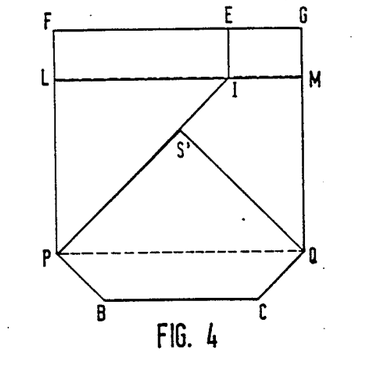

The portion defined by GHNQM is folded to the left, as seen in FIG. 3, along the folding line GMQ and then the portion EFLPI is folded to the right, again as seen in FIG. 3, along the folding line FLP until the second portion is overlaid on the first portion, forming the crossing point S', as shown in FIG. 4.

Figure 5:
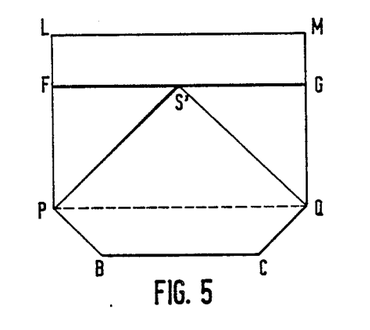

The portion FEGMIL is then turned over downwards along the folding line LIM to bring it into contact with the point S', as shown in FIG. 5.

Figure 6:
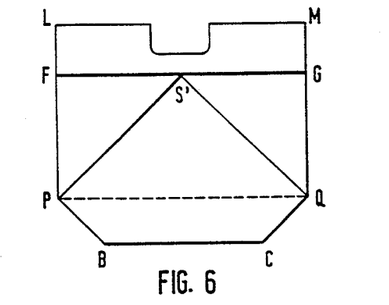

In one particular embodiment a central section of this portion is removed by cutting, starting from its upper edge, as shown in FIG. 6.

In this embodiment a rod indicated with U', made of wood, bamboo, paper board or any other sufficiently strong material, is inserted under the flaps PS', QS' to bring it against the folds LV' and Z'M, thus forming a carrying handle. The portion LMGF is lastly fixed to the underlaying surface in any conventional way, as an example by means of eyelets T' from outside to inside, as shown in FIG. 7.

Figure 8:
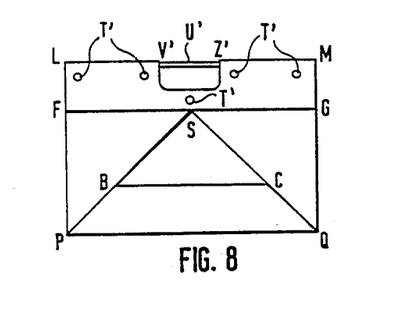

In order to obtain a condition of minimum bulk, when not in use, the portion PQCB can be turned upwards along the line PQ as shown in FIG. 8. When the above described steps are completed, a carrier bag of the present invention is obtained, which in its assembled shape appears as shown in FIG. 9 in a perspective view in the open condition.

Figure 7:
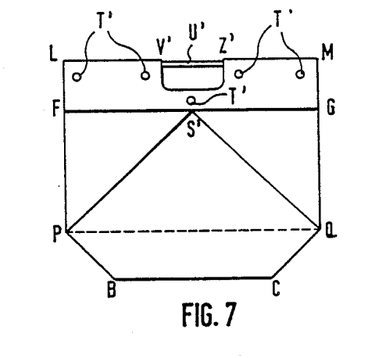
Figure 9:
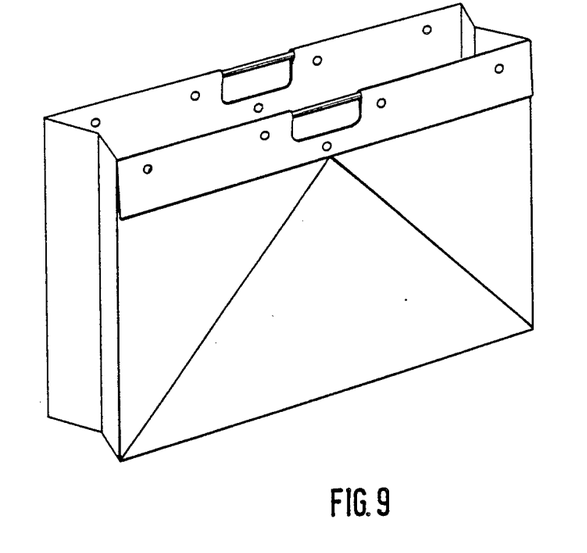
FIG. 9 is a perspective view of the carrier bag of the invention in an open condition as obtained after formation of the blank of FIG. 1.

In order to realize the handle of the bag, various carrying means can be provided, as an alternative to the rod U' shown in FIGS. 7 to 9.

Alternative carrying means can be a rope or the like passing through holes provided in the flap LMFG and fixed by a tie. The holes can be reinforced by eyelets.

In order to reinforce the flap LMFG which supports the carrying means, a longitudinally folded ledge can be laid on the edge LM of the flap LMFG and fixed by eyelets or the carrying means themselves.

Figure 14:
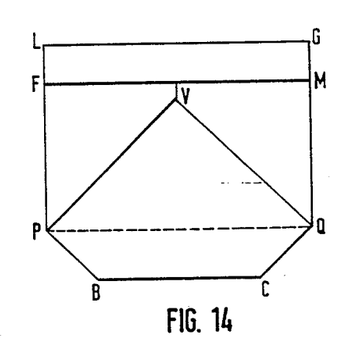
Figure 15:
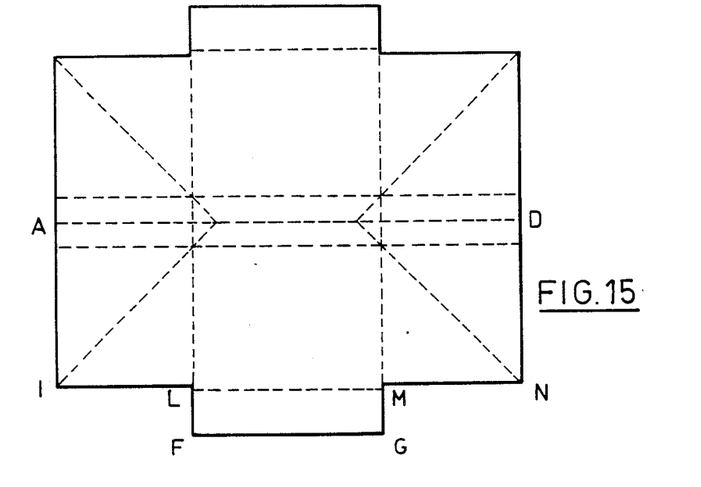
FIGS. 15 and 16 show a modification of the configuration of FIG. 1 to form a gift box.
Figure 16:
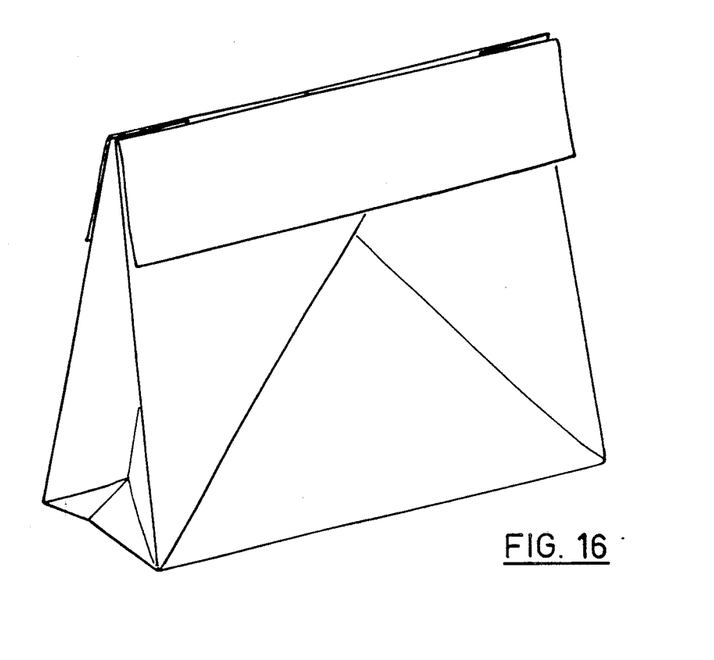

In FIGS. 15 and 16, in which the same reference letters are used as in preceding FIGS. 1 to 14, a modification of the blank is illustrated. According to this modification, the flaps ILEF, MNGH and I*L*E*F*, M*N*G*H* at the four corners have been eliminated. Moreover and preferably the folding lines LM and L*M* are slightly offset outwards to make folding of flaps FGLM and F*G*L*M* easier.

This arrangement is particularly adapted for the use of the erected container as a gift box. The gift box, illustrated in FIG. 16, can be easily closed by metal staples.

The container of the present invention is particularly of value in lieu of plastic bags, when supplied to a shopping center in the flat blank condition and erected by the shopper when required by the selling conditions.

In FIGS. 10 to 14 a further modification of blank is illustrated, which enables a bag to be assembled having the advantage of a greater stiffness.

In these figures the same reference letters are used as in FIG. 1 to indicate points similar to those of FIG. 1, so that a further detailed description is not required.

Figure 10:
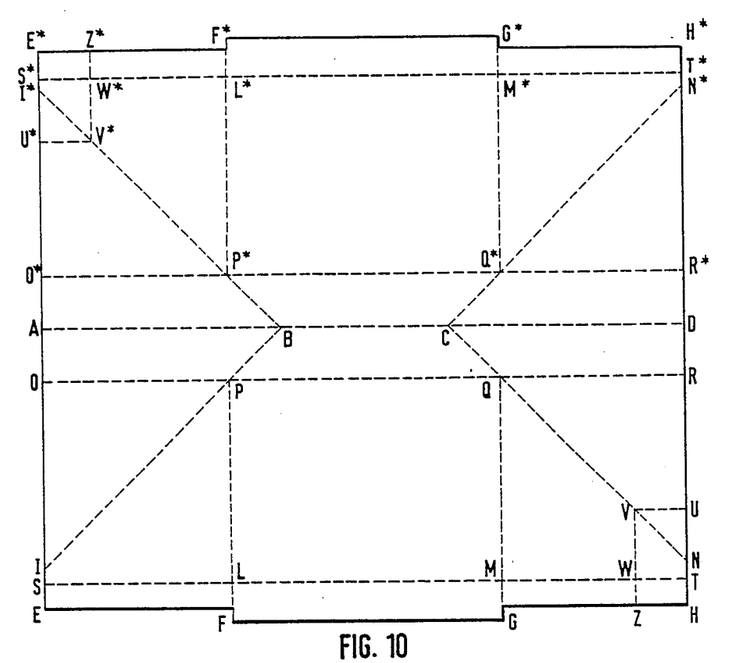
FIGS. 10 to 14 show a modification of the carrier bag of the invention.

With reference to FIG. 10 the lower right corner of the blank is described in comparison with a similar corner of the blank shown in FIG. 1.

In this modification, the longitudinal peripheral folding line indicated with ST is moved towards the edge of the blank, with respect to the equivalent line IN on FIG. 1. The diagonal folding line QN again bisects the right-angle formed by the transveral folding line QM and the longitudinal folding line OR, however, the end point N thereof is displaced towards the middle line AD, with respect to the longitudinal folding line ST.

From a point V placed on line QN to the edges of the blank, two additional folding lines VU and VZ are provided in the longitudinal direction and in the transversal direction respectively. The latter line VZ crosses the longitudinal line ST at a point W.

These additional folding lines VZ and VU are present only in correspondence with two diagonally opposite corners of the blank.

The formation of the bag is similar to that illustrated for the embodiment of FIG. 1.

Figure 11:
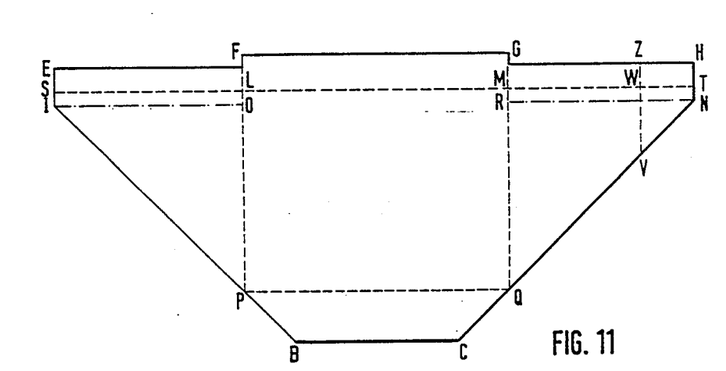

By folding similarly to what is illustrated with reference to FIG. 2, a substantially trapezoidal configuration is obtained as shown in FIG. 11. In this configuration, the edge of the bag formed by the side RN of the blank is made to become parallel to the line MT on FIG. 11 to the height of the point N. This side NR is hidden from the sight behind the visible fold GONH of the blank and it is shown with a dashed and dotted line on FIG. 11.

Figure 12:
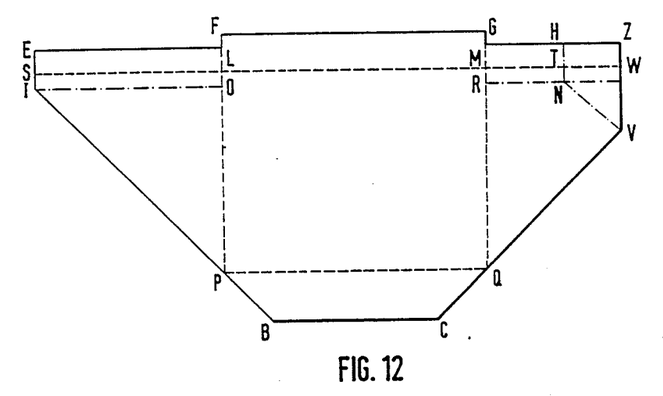

When the fold ZVHN is turned over along the folding lines ZV and VN, the configuration shown in FIG. 12 is obtained, in which the lines not in sight are shown with dashed and dotted lines.

Figure 13:
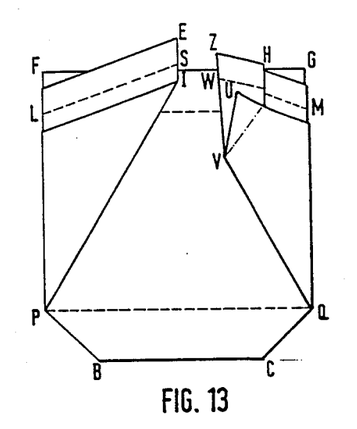

Folding is carried out along the lines FP and GQ as in the previous embodiment and the configuration illustrated in FIG. 13 is obtained.

As the folding is completed, the edge ESI is inserted between the two folds united by the folding line VN, so that the edge IP is brought into line with the same line VN.

After folding the flap LFGM about the folding line LM, the configuration of FIG. 14 is obtained.

This configuration results in being reinforced in corrispondence with the area supporting the carrying means, being moreover provided with an improved aesthetic aspect.

The present invention is not restricted to the described embodiments, as modifications can be envisaged without falling out of the scope of the claims.

I claim:

1. A carrier bag comprising a pair of face walls, a pair of side walls and a base wall, erected from a flattened store condition and obtained from an integral flat blank (E*H*HE) of substantially rectangular shape with longitudinal and transversal sides on which a set of folding lines is provided, said folding lines consisting of a longitudinal middle folding line (AD) parallel to longitudinal sides (E*H*, EH) of said blank, two longitudinal inner folding lines (O*R*, OR) parallel and symmetrical to said middle folding line; two longitudinal peripheral folding lines (I*N*, IN) parallel and symmetrical to said middle folding line, wherein the distance of said peripheral folding line from said middle line is at least twice the distance of the inner folding lines to said middle line; two pairs of transversal folding lines (F*P*, G*Q*, FP, GQ) parallel to the transversal sides of the blank, each pair being symmetrical to the other pair with respect to said middle line and each of said transversal folding lines extending from one of said longitudinal sides to meet the closest inner folding line; two pairs of diagonal folding lines (I*B, N*C, NC, IB) each line of one pair extending from a common point (B, C) of said middle line (AD) to a point (I, I, N*, N) on the transversal side closest to said common point (B, C) and bisecting the right-angle formed by said inner folding lien (OR, O*R) and said transversal folding lines (FP, GQ, F*P*, G*Q), said carrier bag on each face thereof in said flattened store condition comprising:

a one-ply face wall with a profile of a six sided polygon resulting from a rectangle and a regular trapezium united at long sides thereof, and wherein short sides of the rectangle defining the height of the bag and the height of the trapezium define the half width of the base wall of the bag;

a first triangular fold formed of two plies, one ply being united to said face wall at a first of said short sides, and the other ply being united to the adjacent side wall, said first web being turned over said face wall with a vertex of said triangular fold placed over the long side of said rectangle opposite to said trapezium;

a second fold similar to said first fold united at a second short side of the rectangle, said second fold being partially overlaid to said first fold; and a flap united to said face wall at the long side of said rectangle opposite to said trapezium, said flap being turned over said first and second triangular folds, said flap, said first and second fold and said face wall being provided with at least a hold for receiving a flexible carrying handle, whereby the bag can be erected from said flattened condition and used without any glueing or fixing operation being involved.

2. Carrier bag according to claim 1, in which said diagonal folding lines (I*B, N*C, NC, IB) have an end point in common with one of said longitudinal peripheral folding lines, in correspondence with a transversal side of the blank.

3. Carrier bag according to claim 1, in which the portion of blank included between a longitudinal side (EH, E*H*) and the longitudinal peripheral folding line (IN, I*N*), adjacent thereto, except for the area between said transversal folding lines (FP, GQ, and F*P*, G*Q*), is removed.

4. Carrier bag according to claim 1, in which said longitudinal peripheral folding lines are placed between one longitudinal side of the blank and the end points of the diagonal folding lines on the transversal sides of the blank.

5. Carrier bag according to claim 4, in which in correspondence with two diagonally opposite corners of the blank, two additional folding lines are provided in the transversal and longitudinal direction respectively (VU, V*U* and VZ, V*Z*) which extend from a point on a diagonal folding line to the longitudinal or transversal side respectively of the blank.

* * * * *